United States Patent
Grigg et al.

(10) Patent No.: US 8,113,753 B1
(45) Date of Patent: Feb. 14, 2012

(54) DUNNAGE ELEMENT

(76) Inventors: Ardis G. Grigg, Greenville, NC (US); Sandra H. Grigg, Greenville, NC (US)

( * ) Notice: Subject to any disclaimer, the term of this patent is extended or adjusted under 35 U.S.C. 154(b) by 253 days.

(21) Appl. No.: 12/583,171

(22) Filed: Aug. 17, 2009

(51) Int. Cl.
    *B60P 7/08* (2006.01)
(52) U.S. Cl. ........... 410/121; 410/39; 410/106; 410/155
(58) Field of Classification Search .................... 410/39, 410/41, 46, 49, 90, 91, 94, 99, 120, 121, 410/140, 155, 105, 106; 206/453, 586, 593; 248/346.01, 351
    See application file for complete search history.

(56) References Cited

U.S. PATENT DOCUMENTS

| | | | |
|---|---|---|---|
| 2,891,490 A * | 6/1959 | Elsner | 410/105 |
| 3,684,113 A | 8/1972 | Roller | |
| 4,315,707 A * | 2/1982 | Fernbach | 410/47 |
| 4,906,021 A | 3/1990 | Rowe et al. | |
| 5,513,941 A | 5/1996 | Kulas et al. | |
| 5,823,724 A * | 10/1998 | Lee | 410/104 |
| 6,659,524 B1 | 12/2003 | Carlson | |
| 6,860,536 B1 | 3/2005 | Schimunek | |
| 7,111,887 B2 | 9/2006 | Cooley | |

* cited by examiner

*Primary Examiner* — Stephen Gordon
(74) *Attorney, Agent, or Firm* — Richard L. Mikesell

(57) ABSTRACT

A steel dunnage element includes a countersunk portion defined adjacent to a working face of the element and which has two slots defined therein. The ends of the dunnage element include grooves to define hand holds and are arcuate so as to not harm a tie down cord that contacts the element. The slots are used to secure the dunnage element in a suitable location. Friction material can be located in the countersunk portion to further secure the cargo.

1 Claim, 1 Drawing Sheet

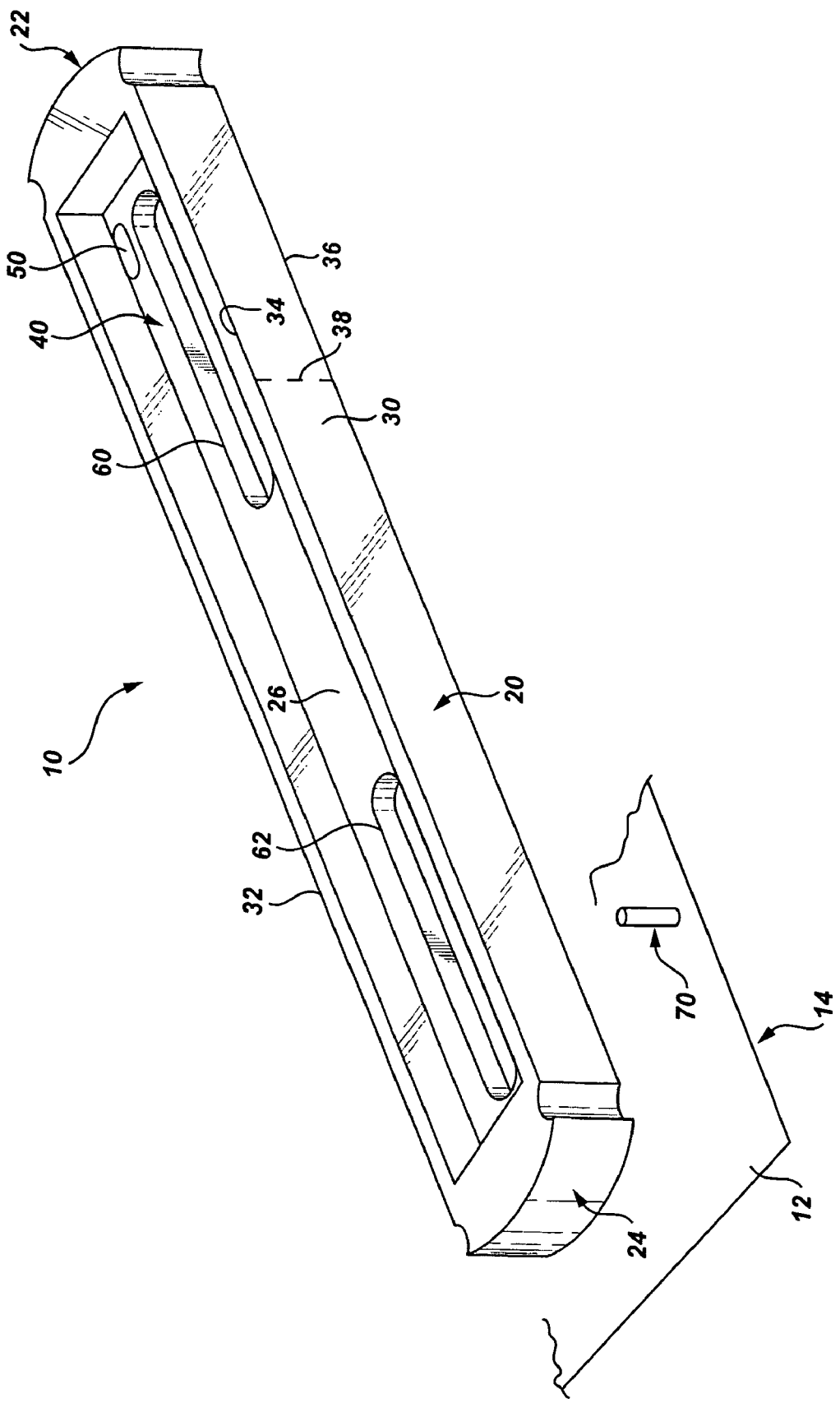

DUNNAGE ELEMENT

TECHNICAL FIELD OF THE INVENTION

The present invention relates to the general art of cargo carriers, and to the particular field of accessories for cargo carriers.

BACKGROUND OF THE INVENTION

For purposes of highway shipment, unit loads of wall board, lumber and the like are routinely placed on a flatbed semi-trailer which in turn is attached to, and supported by a fifth wheel device on a modern truck tractor.

Currently, semi-trailers of the type referred to are primarily constructed of longitudinal and transverse steel support members, attached to and covered by heavy gauge sheet metal flooring or decking sections, resulting in a platform-like upper surface upon which the units loads of freight are loaded.

Normally semi-trailers are loaded by utilizing standard motorized forklift trucks. Forklift trucks are commonly used for moving sawed lumber and other similarly stacked material. In connection with this moving it is necessary that space be provided beneath the stacks of lumber to enable the forks to be placed under the lumber in order that it may be lifted by the forklift truck and carried to a desired location. Similarly, at the new location where it is desired to deposit the lumber it is necessary that space be provided so that the forks may be withdrawn from the stack. This space has usually been provided by means of dunnage boards arranged transversely to the pile of lumber and located between the lowest tier of freight and the flatbed semi-trailer platform-like upper surface, as well as between each subsequent tier of freight which are of sufficient thickness to permit the fork to be inserted under the load. Typically such boards might be 4 inches×4 inches. The dunnage has two faces, a first face which is located adjacent to the bed of the vehicle and a second face, generally called the working face, which is placed adjacent to the load and a second face which is located adjacent to the vehicle surface on which the load is supported.

The dunnage allows for space in which the fork-like projections of a forklift truck can be maneuvered during loading and unloading operations, as well as providing support for the unit freight loads during transport. In most cases, the dunnage is formed from the same type of material as the freight being transported. This will prevent damage to the freight during transport over rough roadways which would otherwise occur if there were direct contact between the freight and harder surfaces such as steel for example.

However, there are many instances when simply placing a 4×4 board beneath the load does not elevate the load far enough above the support deck to permit off-loading equipment to get under the load. Often, steel companies use overhead cranes to off-load product. Overhead cranes requires taller dunnage to make placement of lifting slings easier. If such a situation is anticipated, drivers often simply place another board on top of the 4×4 boards. This is a very unsafe practice.

Still further, in some instances dunnage might move either during use or during storage. Either situation is not desirable.

Therefore, there is a need for a dunnage element that can be as tall as necessary while still being stable in use and/or in storage.

Still further, many loads must be secured using straps or the like. If the dunnage has sharp edges, the straps may be damaged. Therefore, there is a need for a dunnage element that is not likely to damage tie-down straps.

Placement of dunnage is also important, and it would be desirable to provide a dunnage element that is easily grasped and moved.

SUMMARY OF THE INVENTION

The above-discussed disadvantages of the prior art are overcome by a steel dunnage element that includes a countersunk portion defined adjacent to a working face of the element and which has two slots defined therein. The ends of the dunnage element include grooves to define hand holds and are arcuate so as to not harm a tie down cord that contacts the element. The slots are used to secure the dunnage element in a suitable location. Friction material can be located in the countersunk portion to further secure the cargo.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURE

The invention can be better understood with reference to the following drawing and description. The components in the FIGURE are not necessarily to scale, emphasis instead being placed upon illustrating the principles of the invention. Moreover, in the FIGURE, like referenced numerals designate corresponding parts throughout the view.

FIG. 1 is a perspective view of a dunnage element embodying the principles of the present invention.

DETAILED DESCRIPTION OF THE INVENTION

Referring to the FIGURE, it can be understood that the present invention is embodied in a dunnage element 10 that is interposed between the bottom of a cargo, such as lumber, and the top surface 12 of a cargo portion 14 of a vehicle, such as a mobile trailer, used to haul that cargo.

Dunnage element 10 is formed of steel and includes a body 20 that has a first end 22, a second end 24 and a longitudinal axis 26 which extends between the first and second ends. Body 20 further includes a first side 30 and a second side 32 as well as a first face 34 which is a working face located adjacent to the bottom surface of the load when the dunnage element is in use as well as a second face 36 and a thickness dimension 38 which extends between the first and second faces. A countersunk portion 40 is defined in the body adjacent to the working face and will contain friction material 50, such as a 2×2 or friction padding, when in use to further secure the dunnage element to the cargo. Two elongate slots 60 and 62 are defined in the body adjacent to the countersunk portion and are spaced apart from each other in the direction of the longitudinal axis. The slots accommodate tie down elements to allow the dunnage element to be staked on a bracket 70 that is attached to the frame of the vehicle. The slots and their elongate nature allow adjustment of the bracket to be narrow or wide. Placing the dunnage element on dedicated brackets allows users to located the dunnage element closer to the location where it is needed and thus allows safe storage. Thus, rather than strapping dunnage elements under the vehicle, the dunnage element can be safely and securely held in place on the brackets 70.

Grooves, such as groove 80, are defined in the sides adjacent to the ends of the body to extend in the direction of the thickness dimension. The ends of the body are arcuate and the portion of the arcuate ends located between the grooves 80 define hand holds for grasping the dunnage element. The curved nature of the ends prevents those ends from damaging tie down straps that may extend over the ends.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A support element comprising:
   a motor vehicle having a flat bed for hauling cargo;
   a dunnage element which is interposed between the cargo and the flat bed during hauling of the cargo, the dunnage element including
   a body which is formed of steel and which has first and second arcuate ends, a longitudinal axis which extends between the ends, first and second sides, first and second faces and a thickness dimension which extends between the first and second faces, the first face being a working face which is located adjacent to the cargo during use of the dunnage element,
   two spaced apart slots defined in the body and which extend in the direction of the longitudinal axis, the slots being spaced apart from each other in the direction of the longitudinal axis,
   a countersunk portion defined in the body adjacent to the working face to be located between the ends and the sides,
   friction material located in the countersunk portion, and
   grooves defined in the sides of the body adjacent to the ends of the body, the grooves extending in the direction of the thickness dimension of the body, the ends of the body located between the grooves defining hand hold elements; and
   a bracket on the flat bed to which the body of the dunnage element is attached for storage.

* * * * *